United States Patent
Cao

(10) Patent No.: US 9,423,831 B2
(45) Date of Patent: Aug. 23, 2016

(54) PORTABLE ELECTRONIC DEVICE AND METHOD OPERATING SAME

(71) Applicants: SHENZHEN FUTAIHONG PRECISION INDUSTRY CO., LTD., Shenzhen (CN); Chiun Mai Communication Systems, Inc., New Taipei (TW)

(72) Inventor: Yun-Song Cao, Shenzhen (CN)

(73) Assignees: SHENZHEN FUTAIHONG PRECISION INDUSTRY CO., LTD., Shenzhen (CN); Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/532,020

(22) Filed: Nov. 4, 2014

(65) Prior Publication Data
US 2015/0123922 A1 May 7, 2015

(30) Foreign Application Priority Data
Nov. 4, 2013  (CN) .......................... 2013 1 0536660

(51) Int. Cl.
G06F 1/00 (2006.01)
G06F 1/16 (2006.01)
G06F 3/0484 (2013.01)
G06F 3/0346 (2013.01)

(52) U.S. Cl.
CPC ............ *G06F 1/1643* (2013.01); *G06F 3/0346* (2013.01); *G06F 3/0484* (2013.01)

(58) Field of Classification Search
CPC ........... G06F 3/01; G06F 3/041; G06F 3/042; G06F 3/0425
See application file for complete search history.

(56) References Cited

U.S. PATENT DOCUMENTS

| | | | | |
|---|---|---|---|---|
| 2012/0200802 A1* | 8/2012 | Large | .................. | G02B 6/0046 349/62 |
| 2013/0181896 A1* | 7/2013 | Gruhlke | ................. | G06F 3/017 345/156 |

\* cited by examiner

*Primary Examiner* — Michael Faragalla
(74) *Attorney, Agent, or Firm* — ScienBiziP, P.C.

(57) ABSTRACT

A portable electronic device includes a touch screen display, a proximity sensor, an ambient light sensor, and a controller. The proximity sensor detects and outputs an intensity of the reflected light. The ambient light sensor detects and outputs a variation of an ambient light level of the portable electronic device. The controller deactivates the touch screen display when it is determined by the controller that the intensity of the reflected light is greater than a predetermined intensity, and determines whether the variation of the ambient light level is greater than a predetermined level when it is determined by the controller that the intensity of the reflected light is less than the predetermined intensity. The controller further deactivates the touch screen display when it is determined by the controller that the variation of the ambient light level is greater than the predetermined level.

8 Claims, 5 Drawing Sheets

PORTABLE ELECTRONIC DEVICE AND METHOD OPERATING SAME

FIELD

The subject matter herein generally relates to portable electronic devices, and particularly to a portable electronic device having a touch screen display and a method for controlling the touch screen display.

BACKGROUND

An electronic device, such as a cellular telephone, may include a touch screen display and a proximity sensor. The proximity sensor may be used to determine whether the cellular telephone is near a user's head. When not in proximity to the user's head, the cellular telephone may be placed in a normal mode of operation in which the touch screen display is used to present visual information to the user and in which a touch sensor functionality of the touch screen is enabled. In response to determining that the cellular telephone has been brought into the vicinity of the user's head, the display may be disabled to conserve power and the touch sensor on the display may be temporarily disabled to avoid inadvertent touch input from contact between the user's head and the touch sensor.

A proximity sensor for use in a cellular telephone may be based on an infrared light-emitting diode and a corresponding infrared light detector. During operation, the light-emitting diode may emit infrared light outwards from the cellular telephone. When the cellular telephone is not in the vicinity of a user's head, the infrared light will not be reflected towards the light detector and only small amounts of reflected light will be detected by the light detector. When, however, the cellular telephone is adjacent to the user's head, the emitted light from the infrared light-emitting diode will be reflected from the user's head and detected by the light detector.

Light-based proximity sensors such as these may be used to detect the position of a cellular telephone relative to a user's head, but can be challenging to operate accurately. If care is not taken, it can be difficult to determine when a user's head is in the vicinity of the cellular telephone, particularly when a user has hair that is dark colored and exhibits low reflectivity or when the proximity sensor has become smudged with grease from the skin of the user.

BRIEF DESCRIPTION OF THE DRAWINGS

Implementations of the present technology will now be described, by way of example only, with reference to the attached figures.

DETAILED DESCRIPTION

Figure 1:
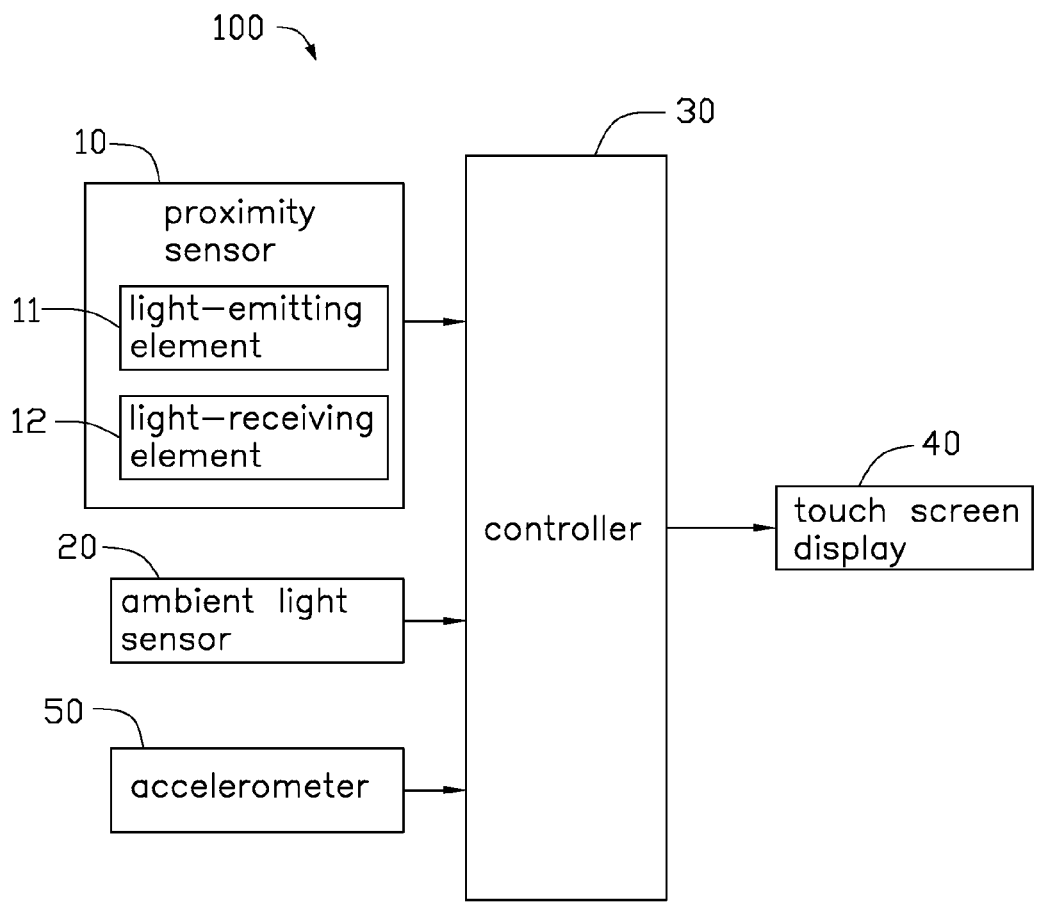
FIG. 1 is a block diagram of one embodiment of a portable electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series and the like.

FIG. 1 illustrates a block diagram of one embodiment of a portable electronic device 100 including a proximity sensor 10, an ambient light sensor 20, a controller 30, and a touch screen display 40. The proximity sensor 10 is configured to determine whether the portable electronic device 100 is in a vicinity of an object, such as a user's head. The ambient light sensor 20 is configured to detect and output a variation of an ambient light level of the portable electronic device 100. The controller 30 is electronically coupled to both the proximity sensor 10 and the ambient light sensor 20, and is configured to activate/deactivate the touch screen display 40 according to the determination of the proximity sensor 10 and the variation of the ambient light level detected by the ambient light sensor 20.

The proximity sensor 10 includes a light-emitting element 11 and a light-receiving element 12, both of which are electronically coupled to the controller 30. The light-emitting element 11 projects/emits light toward a predetermined space. The light-receiving element 12 receives reflected light, and outputs an intensity of the reflected light to the controller 30. For example, the light-receiving element 12 can output a first electric signal to the controller 30 in accordance with the intensity of the reflected light. The reflected light can be obtained when the light projected by the light-emitting element 11 is reflected from an object (such as a user's head) to be detected to which a detection of whether or not the object to be detected comes close to the proximity sensor 10 is carried out. The controller 30 activates/deactivates the touch screen display 40 by comparing the intensity of the reflected light with a predetermined intensity. When the intensity of the reflected light is greater than the predetermined intensity, the controller 30 deactivates the touch screen display 40. Alternatively, when the intensity of the reflected light is less than the predetermined intensity, the controller 30 further configured to determine whether the variation of the ambient light level is greater than a predetermined level, and deactivate the touch screen display 40 when it is determined by the controller 30 that the variation of the ambient light level is greater than the predetermined level.

For example, when a call is established, the proximity sensor 10 is activated by the controller 30. If the user holds the portable electronic device 100 adjacent to the user's ear such that the portable electronic device 100 is brought into a vicinity of the user's head, the intensity of the reflected light is greater than the predetermined intensity, the controller 30 deactivates the touch screen display 40 to conserve power and prevent inadvertent touch input. Alternatively, if the portable electronic device 100 is not brought into (or is absent from) the vicinity of the user's head, the intensity of the reflected light is less than the predetermined intensity, the controller 30 keeps the activation of the touch screen display 40 or activates the touch screen display 40 again. However, when the portable electronic device 100 is brought into a vicinity of the user's head and the user has hair that is dark and exhibits low reflectivity, the intensity of the reflected light may be less than the predetermined intensity. At this time, the controller 30 further compares the variation of the ambient light level with a predetermined level, to determine whether or not the touch screen display 40 should be deactivate.

In one embodiment, when the ambient light sensor 20 detects a first ambient light level when the portable electronic device 100 establishes the call, and detects a second ambient light level when the controller 30 determines that the intensity of the reflected light is less than the predetermined intensity. The variation of the ambient light level is a difference between the first and second ambient light levels. In particular, the first ambient light level is an average value of a plurality of ambient light levels (such as ten ambient light levels) detected by the ambient light sensor 20 within a predetermined time (such as two seconds) after the call is established.

As illustrated in FIG. 1, the portable electronic device 100 is also provided with an accelerometer 50 electronically coupled to the controller 30. The accelerometer 50 is configured to measure a tilt angle of the portable electronic device 100 with respect to earth ground plane. The controller 30 is further configured to determine whether the touch screen display 40 should be deactivated according to the slope angle when it is determined by the controller 30 that the variation of the ambient light level is less than the predetermined level.

Figure 2:
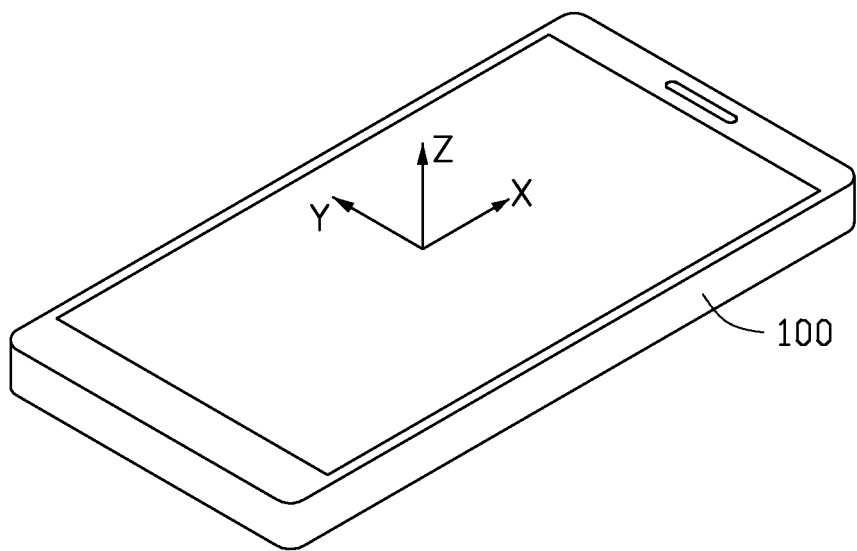
FIG. 2 is an isometric view of the portable electronic device as shown in FIG. 1.

FIG. 2 illustrates an isometric view of the portable electronic device 100 as shown in FIG. 1. The tilt angle of the portable electronic device 100 can be defined by three accelerations of the portable electronic device 100 in three directions of X axes, Y axes, and Z axes, which are substantially perpendicular to each other. As shown in FIG. 2, the Z axes is substantially perpendicular to a plane in which the touch screen display 40 is positioned, the Y axes and X axes are positioned in the plane in which the touch screen display 40 is positioned. In one embodiment, when the acceleration in X axes is in a range from −0.87 g to zero (wherein g is the gravity acceleration, and a value of g is about 9.8), the acceleration in Y axes is in a range from 0.71 g to g, and the acceleration in Z axes is in a range from zero to 0.25 g, the controller 30 deactivates the touch screen display 40. Alternatively, when any one of the X axes, Y axes, and Z axes is out of its corresponding range, the controller 30 keeps the activation of the touch screen display 40 or activates the touch screen display 40 again.

For example, when the portable electronic device 100 is located on a level plane, such as a surface of table, the accelerations of X axes and Y axes are zero, while the acceleration of the Z axes is about g (9.8). When the call is established and the portable electronic device 100 is held adjacent to the user's ear, the portable electronic device 100 is sloped, and the accelerations of X axes, Y axes, and Z axes are, for example, −0.714 g, 8 g and 1.45 g respectively.

Figure 3:
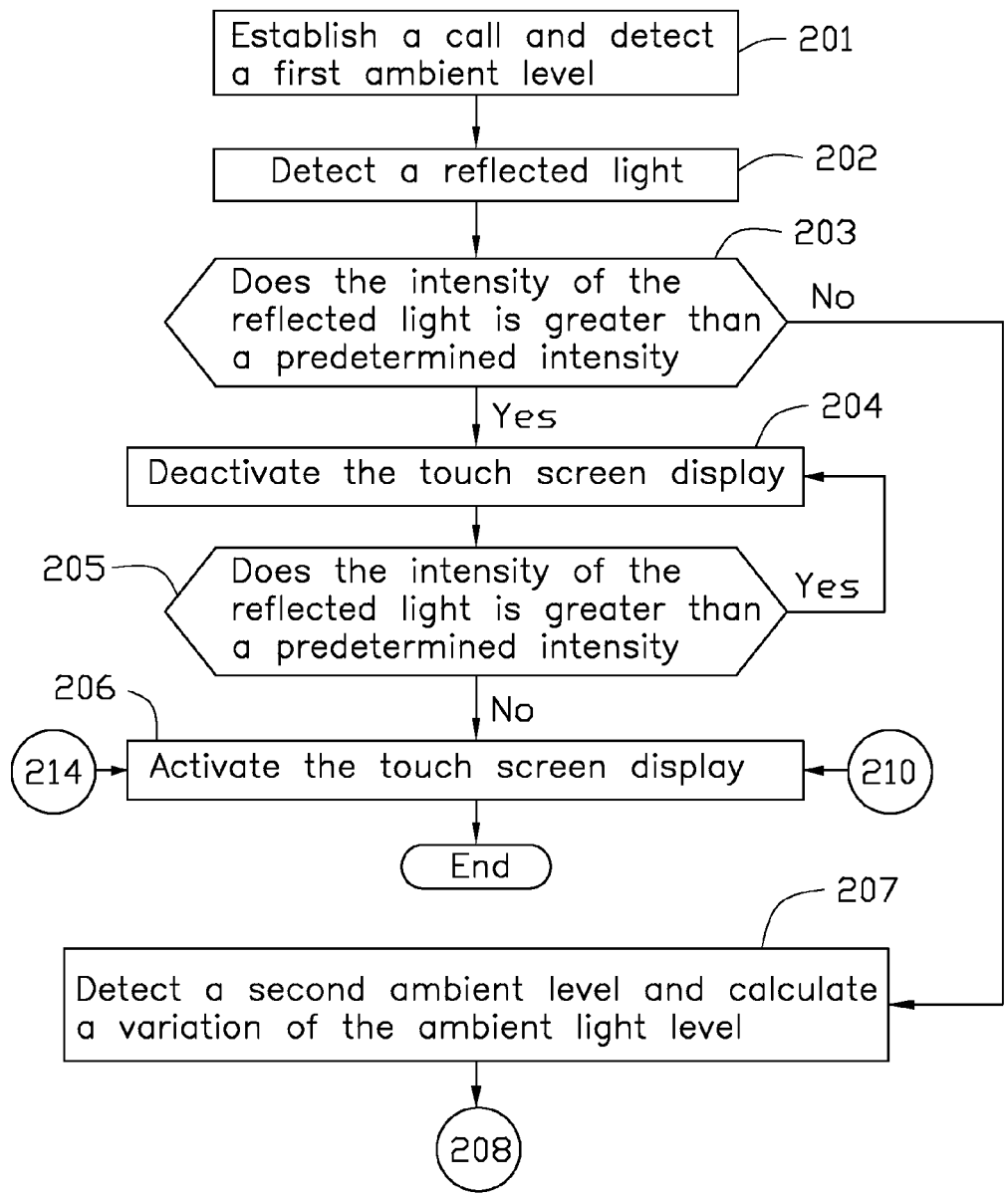
FIGS. 3-4 are a flowchart of one embodiment of a method for controlling a touch screen display of a portable electronic device.
Figure 4:
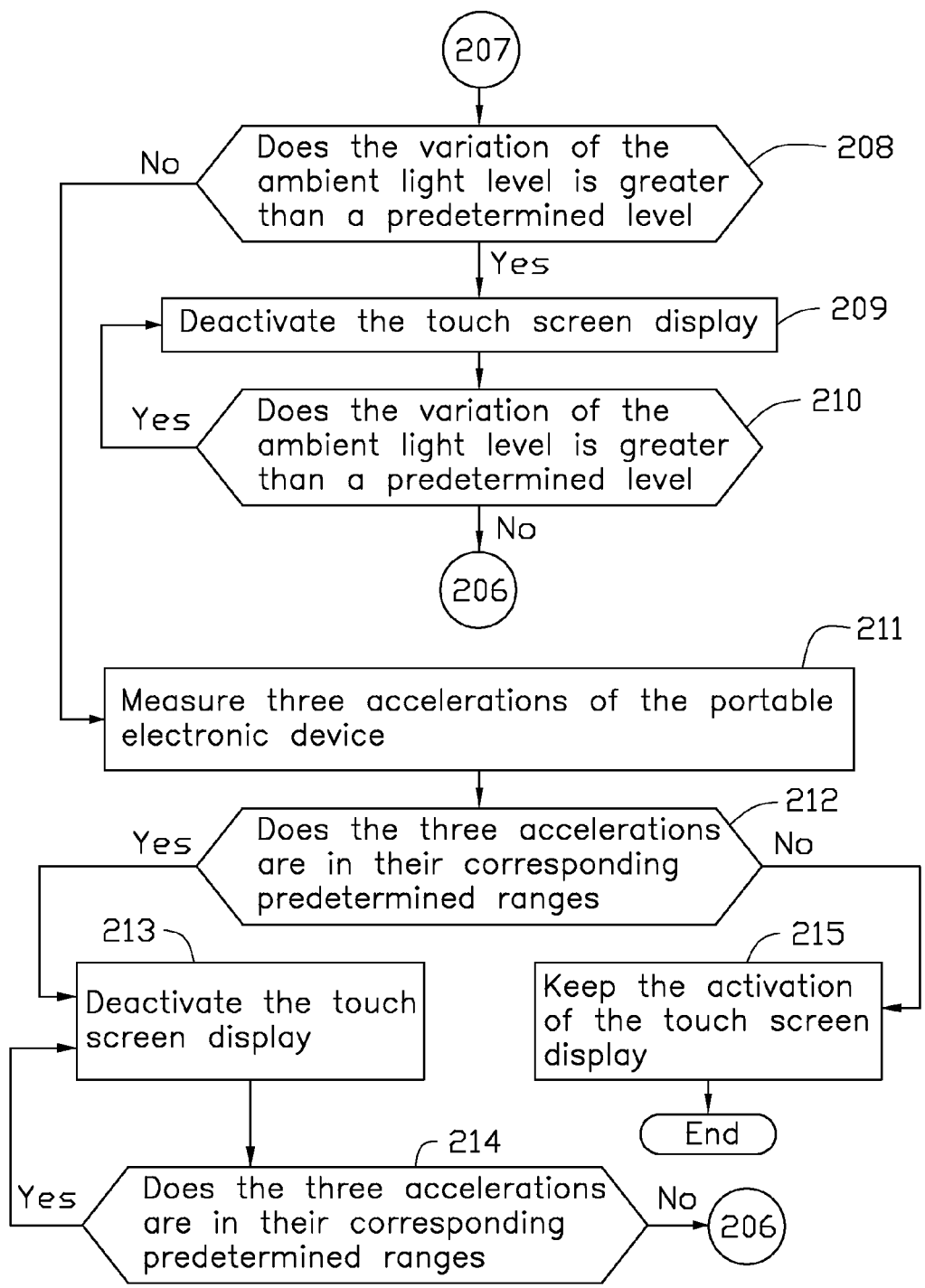

Referring to FIGS. 3-4, a flow chart is presented in accordance with an example embodiment which is being thus illustrated. The example method 200 is provided by way of example, as there are a variety of ways to carry out the method. The method 200 described below can be carried out using the configurations illustrated in FIGS. 1-2, for example, and various elements of these figures are referenced in explaining example method 200. Each block shown in FIG. 3 represents one or more processes, methods or subroutines, carried out in the exemplary method 200. Additionally, the illustrated order of blocks is by example only and the order of the blocks can change according to the present disclosure. The exemplary method 200 can begin at block 201.

At block 201, a call is established by the portable electronic device 100. The ambient light sensor 20 detects a first ambient level. In one embodiment, the first ambient light level is an average value of a plurality of ambient light levels (such as ten ambient light levels) detected by the ambient light sensor 20 within a predetermined time (such as two seconds) after the call is established.

At block 202, the proximity sensor 10 detects and output an intensity of a reflected light. Details of detecting an intensity of a reflected light will be described in FIG. 4.

At block 203, the controller 30 determines whether the intensity of the reflected light is greater than a predetermined intensity. Upon the condition that the intensity of the reflected light is greater than the predetermined intensity, block 204 is implemented. Otherwise, upon the condition that the intensity of the reflected light is less than the predetermined intensity, block 207 is implemented.

At block 204, the controller 30 deactivates the touch screen display 40.

At block 205, the controller 30 determines whether the intensity of the reflected light is greater than a predetermined intensity. Upon the condition that the intensity of the reflected light is greater than the predetermined intensity, block 204 is implemented. Otherwise, upon the condition that the intensity of the reflected light is less than the predetermined intensity, block 206 is implemented.

At block 206, the controller 30 activates the touch screen display 40.

At block 207, the ambient light sensor 20 detects a second ambient level, and calculates and outputs a variation of the ambient light level to the controller 30. The variation of the ambient light level is a difference between the first and second ambient light levels.

At block 208, the controller 30 determines whether the variation of the ambient light level is greater than a predetermined level. Upon the condition that the variation of the ambient light level is greater than the predetermined level, block 209 is implemented. Otherwise, upon the condition that the variation of the ambient light level is greater than the predetermined level, block 211 is implemented.

At block 209, the controller 30 deactivates the touch screen display 40.

At block 210, the controller 30 determines whether the variation of the ambient light level is greater than a predetermined level. Upon the condition that the variation of the ambient light level is greater than the predetermined level, block 209 is implemented. Otherwise, upon the condition that the variation of the ambient light level is greater than the predetermined level, block 206 is implemented.

At block 211, the controller 30 control the accelerometer 50 to measure three accelerations of the portable electronic device 100 in three directions of X axes, Y axes, and Z axes, which are substantially perpendicular to each other.

At block 212, the controller 30 determines whether the three accelerations are in their corresponding predetermined ranges. In one embodiment, the predetermined range of the acceleration of the X axes is from about −0.87 g to zero (wherein g is the gravity acceleration, and a value of g is about 9.8), the predetermined range of the acceleration of the Y axes is from 0.71 g to g, and the predetermined range of the acceleration of the Z axes is from zero to 0.25 g. Upon the condition that the three accelerations are in their corresponding predetermined ranges, block 213 is implemented. Otherwise, upon the condition that any one of the three accelerations is out of its corresponding predetermined range, block 215 is implemented.

At block 213, the controller 30 deactivates the touch screen display 40.

At block 214, the controller 30 determines whether the three accelerations are in their corresponding predetermined ranges. Upon the condition that the three accelerations are in their corresponding predetermined ranges, block 213 is implemented. Otherwise, upon the condition that any one of the three accelerations is out of its corresponding predetermined range, block 206 is implemented.

At block 215, the controller 30 keeps the activation of the touch screen display 40.

Figure 5:
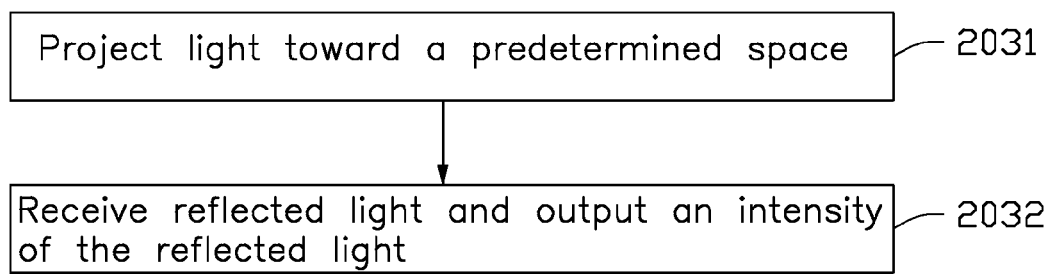
FIG. 5 is a detailed description of block 202 in FIG. 3.

FIG. 5 is a detailed description of block 202. Depending on the embodiment, additional blocks may be added, others removed, and the ordering of the blocks may be changed.

At block 2031, the light-emitting element 11 projects light toward a predetermined space.

At block 2032, the light-receiving element 12 receives reflected light of the light projected by the light-emitting element 11, and outputs an intensity of the reflected light.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A portable electronic device comprising:
    a touch screen display;
    a proximity sensor comprising a light-emitting element and a light-receiving element, the light-emitting element configured to project light toward a predetermined space, the light-receiving element configured to receive reflected light and output an intensity of the reflected light;
    an ambient light sensor configured to detect and output a variation of an ambient light level of the portable electronic device; and
    a controller electronically coupled to both the light-receiving element and the ambient light sensor to receive the intensity of the reflected light and the variation of the ambient light level, the controller configured to deactivate the touch screen display when it is determined by the controller that the intensity of the reflected light is greater than a predetermined intensity, and determine whether the variation of the ambient light level is greater than a predetermined level when it is determined by the controller that the intensity of the reflected light is less than the predetermined intensity; the controller further configured to deactivate the touch screen display when it is determined by the controller that the variation of the ambient light level is greater than the predetermined level;
    wherein the ambient light sensor is configured to detect a first ambient light level when the portable electronic device establishes a call, and the first ambient light level is an average value of a plurality of ambient light levels detected by the ambient light sensor within a predetermined time after the call is established.

2. The portable electronic device of claim 1, wherein the ambient light sensor is further configured to detect a second ambient light level when the controller determines that the intensity of the reflected light is less than the predetermined intensity, and the variation of the ambient light level is a difference between the first and second ambient light levels.

3. The portable electronic device of claim 1, further comprising an accelerometer electronically coupled to the controller, and configured to measure a tilt angle of the portable electronic device with respect to earth ground plane, wherein the controller is configured to either activate or deactivate the touch screen display according to the slope angle when it is determined by the controller that the variation of the ambient light level is less than the predetermined level.

4. The portable electronic device of claim 3, wherein the tilt angle is defined by three accelerations of the portable electronic device in three directions of first axes, second axes, and third axes, which are substantially perpendicular to each other, the third axes is substantially perpendicular to a plane in which the touch screen display is positioned, the second axes and first axes are positioned in the plane in which the touch screen display is positioned; when the acceleration in first axes is in a range from −0.87 g to zero, the acceleration in second axes is in a range from 0.71 g to g, and the acceleration in third axes is in a range from zero to 0.25 g, the controller deactivates the touch screen display; wherein g is the gravity acceleration.

5. A method of control a touch screen display of a portable electronic device, comprising:
    projecting light toward a predetermined space when the portable electronic device establish a call;
    receiving reflected light and outputting an intensity of the reflected light;
    determining whether the intensity of the reflected light is greater than a predetermined intensity;
    detecting a variation of an ambient light level of the portable electronic device upon the condition that the intensity of the reflected light is less than the predetermined intensity;
    determining whether the variation of the ambient light level is greater than a predetermined level; and
    deactivating the touch screen display upon the condition that the variation of the ambient light level is greater than the predetermined level;
    wherein the step of detecting a variation of an ambient light level of the portable electronic device comprises:
        detecting a first ambient light level when the portable electronic device establishes a call, wherein the first ambient light level is an average value of a plurality of ambient light levels detected by the ambient light sensor within a predetermined time after the call is established.

6. The method of claim 5, wherein the step of detecting a variation of an ambient light level of the portable electronic device further comprising:
    detecting a second ambient light level upon the condition that the intensity of the reflected light is less than the predetermined intensity; and
    calculating and outputting a difference between the first and second ambient light levels.

7. The method of claim 5, further comprising:
- measuring three accelerations of the portable electronic device in three directions of a first axes, a second axes, and a third axes which are substantially perpendicular to each other, upon the condition that the variation of the ambient light level is less than the predetermined level;
- determining whether the three accelerations are in their corresponding predetermined ranges; and
- deactivating the touch screen display upon the condition that the three accelerations are in their corresponding predetermined ranges.

8. The method of claim 7, wherein the third axes is substantially perpendicular to a plane in which the touch screen display is positioned, the second axes and first axes are positioned in the plane in which the touch screen display is positioned, the predetermined range of the acceleration of the X axes is from about −0.87 g to zero, the predetermined range of the acceleration of the Y axes is from 0.71 g to g, and the predetermined range of the acceleration of the Z axes is from zero to 0.25 g; g is the gravity acceleration.

* * * * *